March 21, 1933.   A. G. HERRESHOFF   1,902,499
VEHICLE BODY DOOR STIFFENER

Filed May 8, 1930

INVENTOR
ALEXANDER G. HERRESHOFF.
BY
*Sterling Harness*
ATTORNEY

Patented Mar. 21, 1933

1,902,499

UNITED STATES PATENT OFFICE

ALEXANDER G. HERRESHOFF, OF HIGHLAND PARK, MICHIGAN, ASSIGNOR TO CHRYSLER CORPORATION, OF DETROIT, MICHIGAN, A CORPORATION OF DELAWARE

VEHICLE BODY DOOR STIFFENER

Application filed May 8, 1930. Serial No. 450,835.

This invention relates to door stiffening structure for vehicle bodies, particularly for rear doors of van type truck bodies.

The main objects of this invention are to provide means of this kind which will form a substantially stiff joint between an edge of a vehicle door and the adjacent door frame structure when the door is closed; to provide improved means of this kind for preventing relative movement between the rear doors of a van type truck body and their surrounding frame so as to obviate rattling; to provide means of this type which forms a seal between the bottom of the door and the adjacent edge of the floor of the body so as to prevent water and dirt from entering the body; to provide frictionally coacting members on a door and door frame respectively of a body which are gradually engaged together during closing of the door by a jackknife action so as to produce an ultimate clamping relation between the members throughout their entire lengths, the initial engagement of said members during closing of the door conditioning one member to freely receive the other; and to provide a device of this kind by which the door of a vehicle body may be frictionally held in partially open positions.

An illustrative embodiment of this invention is shown in the accompanying drawing, in which.

Figure 1:
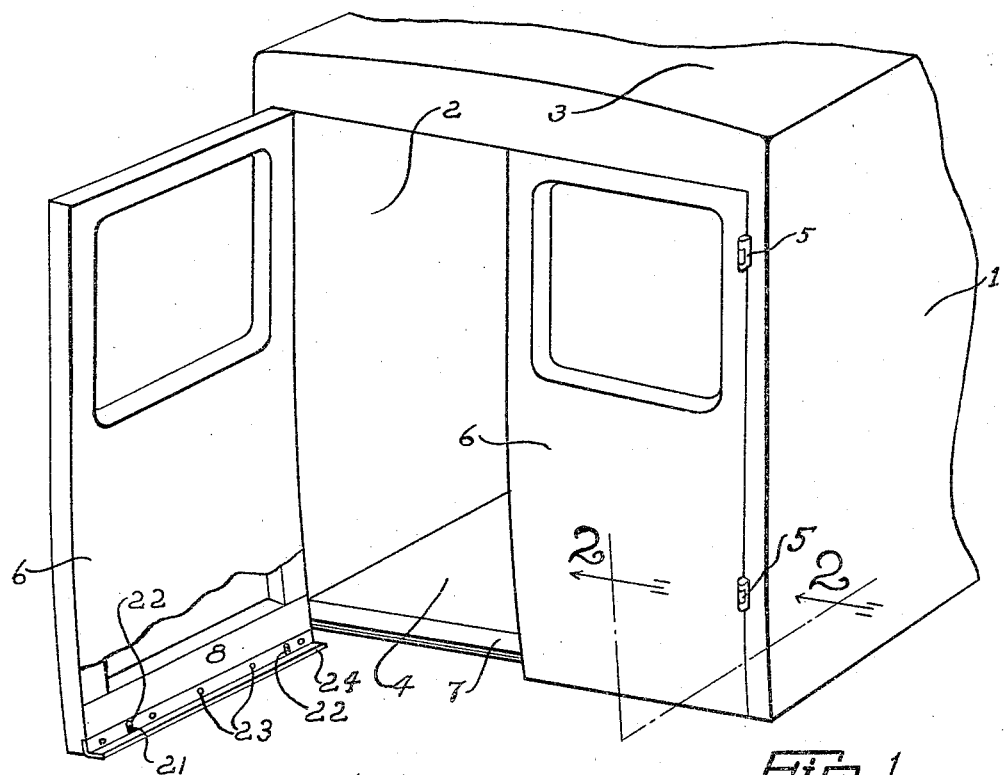
Fig. 1 is a fragmentary perspective view of the rear end of a van type truck body showing one embodiment of my invention.

In the form shown, the vehicle body or housing on which my improved door stiffening device is mounted includes side walls 1 and 2, a top wall 3 and a floor 4 and it has an open rear end. Swingably mounted on hinges 5 on the side walls 1 and 2, are a pair of closures or doors 6 which when in a closed position abut each other substantially at the center of the open end of the body. The side walls 1 and 2 extend beyond the rear edge 7 of the floor 4 an amount substantially equal to the thickness of the door 6 so as to provide a substantially planular rear end on the housing when the doors are closed.

The doors 6 include an inner wood frame having transverse lower end members 8 and a covering of sheet metal paneling material 9. The top surface of the floor 4 is provided with a sheet metal covering 10 which is drawn around the rear extremity 7 of the floor and extended forwardly adjacent the lower surface 11 thereof. The paneling material 9 and covering 10 are secured to the door 6 and floor 4 respectively by paneling nails or other suitable means, not shown.

Figure 2:
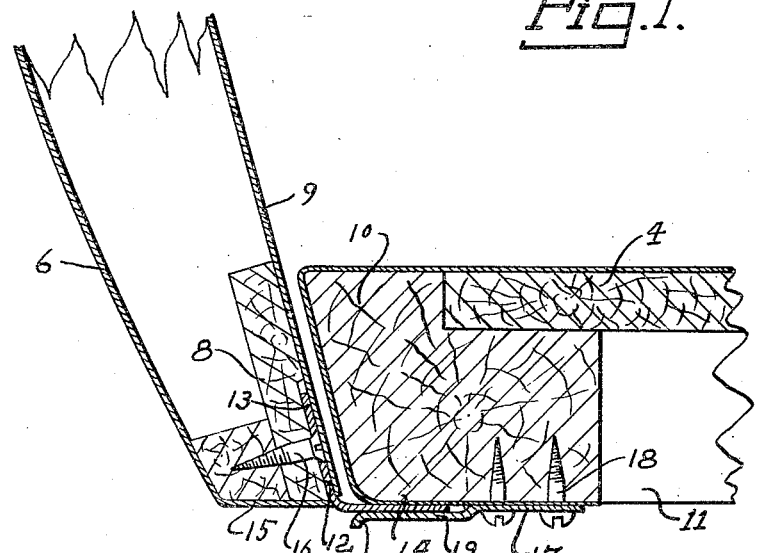
Fig. 2 is a fragmentary longitudinal section taken on line 2—2 of Fig. 1.

Mounted on the inner side of the lower edge portion 12 of the door is an angle bar which has a flange 13 located between the transverse members 8 and the paneling material 9, and a substantially horizontal flange or plate 14 which extend forwardly, as viewed in Fig. 2, below the lower extremity 15 of the door 6. Each door is provided with a similar angle bar which is rigidly mounted thereon by screws 16 extending into the transverse members 8.

A plate 17 is secured by screws 18 to the rear portion of the lower side 11 of the floor 4. The plate 17 extends completely across the width of the floor 4 and has a downwardly offset rear portion 19 on which an arcuate shaped lip 20 is provided. The offset portion 19 is substantially resilient and due to its form it normally holds the lip 20 against the covering material 10 on the lower surface of the floor when the doors 6 are in their open position. When the doors are closed the offset portion 19 forms a slot which is in registration with the horizontal flange or plate 14 into which the latter is extended.

During assembly of each door, the flange 13 of the angle bar is adjustably held on the inner side of the transverse members 8 by a pair of screws 21 which extend through a pair of elongated apertures or slots 22 in the angle bar. The screws 21 are tightened sufficiently to adjustably hold the angle bar against movement relative to the door. The door is then closed causing the flange or plate 14 to be inserted between the metal covering on the lower side 11 of the floor 4 and the offset portion 19 of the plate 17. This action shifts the angle bar vertically placing the plate 14 at the proper elevation. The door is then opened and the screws 16 are inserted through the apertures 23 in the flange 13 so as to permanently hold the angle bar in place.

In operation, as the doors 6 are closed the outer corners 24 of the horizontal flanges 14 are inserted between the covering 10 of the lower side of the floor and the resilient offset portion 19 of the plate 17. This initial closing movement of the door has a spreading action on the offset portion 19 conditioning the latter for freely admitting the remaining portion of the flange 14 which is gradually inserted between the offset portion 19 and the covering 10 by a jackknife action. The resilient offset portion 19 firmly clamps the plates or flanges 14 of the angle bars against the lower side of the covering of the floor, thereby frictionally holding the doors against movement relative to the structure on which they are supported for preventing rattling thereof. The stiffening device also forms a seal between the rear extremity of the floor and the doors which prevents dirt and water from gaining entrance to the interior of the housing.

Although but one specific embodiment of this invention has herein been shown and described, it will be understood that various changes including the size, shape and arrangement of parts may be made without departing from the spirit of my invention and it is not my intention to limit its scope other than by the terms of the appended claims.

I claim:

1. In combination with a truck body having an opening in one side thereof, a door for said opening, a plate on said closure extending substantially normally to said door, said plate being engageable with the lower surface of the floor of said body, and means mounted on said lower surface engageable with the outer side of said plate for resiliently clamping said plate against said floor when said door is closed.

2. In combination with a truck body having an open rear end, a pair of doors, one swingably mounted on the respectively opposite sides of said body at the rear end thereof for closing said rear end, a pair of plates, one extending in advance of the lower edge of each door, and a plate on the floor of said body having a resilient offset portion forming slots in registration with the plates of said doors for receiving the latter, the offset portions of the plate of said floor being adapted to clamp the plates of said doors against said floor.

ALEXANDER G. HERRESHOFF.